(No Model.)

A. KUMMLE.
STRAINER.

No. 405,567. Patented June 18, 1889.

Witnesses.

Inventor
Albert Kummle
By Wm H Lotz
Atty.

UNITED STATES PATENT OFFICE.

ALBERT KUMMLE, OF CHICAGO, ILLINOIS.

STRAINER.

SPECIFICATION forming part of Letters Patent No. 405,567, dated June 18, 1889.

Application filed February 12, 1889. Serial No. 299,659. (No model.)

*To all whom it may concern:*

Be it known that I, ALBERT KUMMLE, a subject of the Emperor of Germany, residing at Chicago, in the county of Cook and State of Illinois, have invented certain new and useful Improvements in Strainers, of which the following is a specification, reference being had therein to the accompanying drawings.

This invention relates to strainers for hotel, boarding-house, and family use, and it has for its object to provide such a strainer in which pressure and friction are applied to force the more solid particles through the small perforations, and thereby levigate the same—as, for example, soup, cooked vegetables, or potatoes; and with that object in view my invention consists in the novel combination of devices hereinafter described, and specifically claimed.

Figure 1:
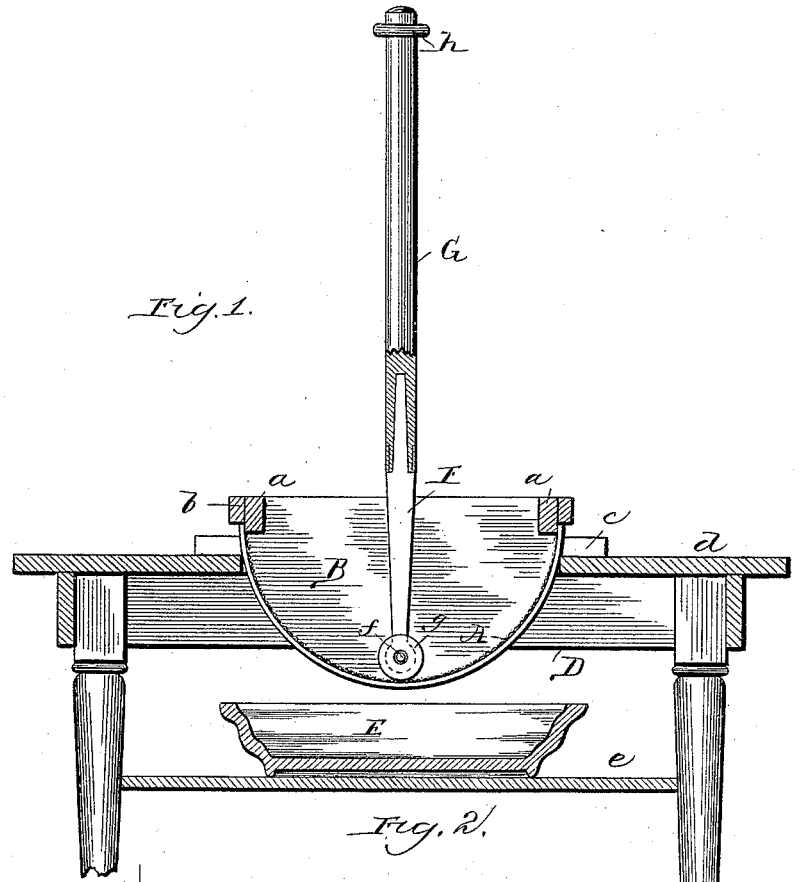
Figure 2:
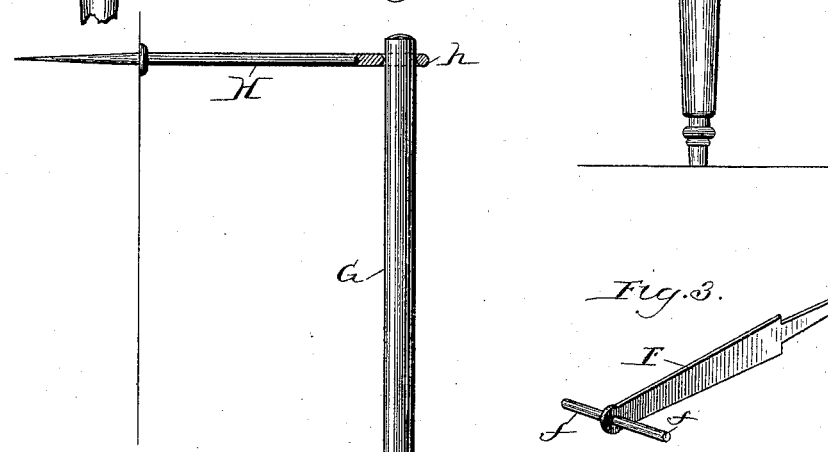
Figure 3:
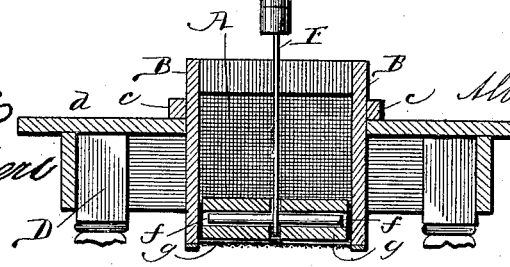

In the accompanying drawings, Figure 1 represents a longitudinal vertical section, and Fig. 2 a transverse vertical section, of the strainer complete as inserted into a table-top; and Fig. 3 is a perspective view of the pressing-roller shank.

Corresponding letters of reference in the several figures of the drawings designate like parts.

A denotes a semi-cylindrical perforated metal plate secured between two semicircular side boards B, connected by transverse bars $a$ and $b$, between which the ends of plate A are clamped, to be rigid therewith. Bars $c$, secured against the side boards B, provide supports for the strainer when inserted into the proper-sized opening of the top $d$ of a table D, specially provided for this strainer, which table also has a shelf $e$, upon which to place a bowl or basin E, to receive the soup or vegetables passed through the strainer. A shank F, having studs $f$, is secured in a handle G, and upon the studs $f$ are pivoted two cylindrical wooden rollers $g$, which will enter between the sides B to roll on the perforated plate. A stud H, secured in the wall, has an eye $h$ in its end, arranged centrally above the strainer, and through this eye $h$ is passed the handle G, to hold and guide the same while the cook moves the rollers $g$ over the semi-cylindrical strainer-plate, applying as much pressure to the handle G as he desires, thereby causing the potatoes or vegetables to pass through the perforations of plate A. After the strainer has thus been used the handle G is removed and the rollers $g$ are taken off to be thoroughly cleaned, and then the strainer is lifted from the table to be also cleaned on both sides.

It will be readily seen that a strainer thus constructed and arranged will be a very useful kitchen utensil, which will facilitate and accelerate the preparation of vegetables and soups, and which can be easily cleaned after being used.

What I claim is—

In combination with the semi-cylindrical strainer, the shank F, provided with laterally-projecting studs $f$ and rollers $g$, mounted on said studs, handle G, and stud H, having eye $h$, through which the upper end of the handle passes, as set forth.

In testimony whereof I affix my signature in presence of two witnesses.

ALBERT KUMMLE.

Witnesses:
WILLIAM H. LOTZ,
OTTO LUBKERS.